United States Patent
Yadav et al.

(10) Patent No.: US 11,356,600 B2
(45) Date of Patent: Jun. 7, 2022

(54) MACHINE LEARNING OPERATIONS ON DIFFERENT LOCATION TARGETS USING CAMERA ORIENTATION

(71) Applicant: Microsoft Technology Licensing, LLC, Redmond, WA (US)

(72) Inventors: Mahesh Yadav, Redmond, WA (US); Donghee Pi, Bellevue, WA (US); Robyn E. Dunn, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 16/820,221

(22) Filed: Mar. 16, 2020

(65) Prior Publication Data
US 2021/0289131 A1  Sep. 16, 2021

(51) Int. Cl.
*H04N 5/228* (2006.01)
*H04N 5/232* (2006.01)
*G06N 20/00* (2019.01)

(52) U.S. Cl.
CPC ......... *H04N 5/23222* (2013.01); *G06N 20/00* (2019.01); *H04N 5/23206* (2013.01); *H04N 5/23245* (2013.01)

(58) Field of Classification Search
CPC ........... H04N 5/23222; H04N 5/23245; H04N 5/23206; G06N 20/00; G06N 3/08; G06T 2207/20081
See application file for complete search history.

(56) References Cited

U.S. PATENT DOCUMENTS

| | | |
|---|---|---|
| 2015/0215871 A1 | 7/2015 | Schillings et al. |
| 2016/0096270 A1 | 4/2016 | Ibarz gabardos et al. |
| 2016/0284095 A1* | 9/2016 | Chalom ................ G06K 9/627 |
| 2016/0366330 A1 | 12/2016 | Boliek et al. |
| 2018/0041701 A1* | 2/2018 | Yanagi ............... H04N 5/23258 |
| 2019/0208181 A1 | 7/2019 | Rowell et al. |
| 2020/0193328 A1* | 6/2020 | Guestrin ................ G06T 7/194 |
| 2021/0195107 A1* | 6/2021 | Corsica ................ H04N 5/2252 |

OTHER PUBLICATIONS

"Samsung Galaxy A80: World's 1st Rotating Triple Camera", Retrieved From: https://www.youtube.com/watch?V=UOdrQlq160A, Aug. 23, 2019, 1 Page.

(Continued)

*Primary Examiner* — Kelly L Jerabek

(57) ABSTRACT

A machine learning (ML) operating mode is selected for a camera. A physical orientation of a housing of a camera is determined. In response to determining the orientation, an operating mode from a set of operating modes is selected. The set of operating modes includes at least a ML inference mode and a ML training mode. Based on the selected operating mode, images obtained by an image capturing unit are processed. In the ML inference mode, a ML controller applies a ML model to the images to infer or predict characteristics of the image (e.g., detecting objects within the images). In the ML training mode, the ML controller is configured to cause a ML model to be trained using images captured by the image capturing unit, either local to the camera or on a remotely located computing device.

20 Claims, 6 Drawing Sheets

(56) References Cited

OTHER PUBLICATIONS

Itzkovitch, Avi, "Designing For Device Orientation: From Portrait To Landscape", Retrieved from: https://www.smashingmagazine.com/2012/08/designing-device-orientation-portrait-landscape/, Aug. 10, 2012, pp. 1-15.

"International Search Report and Written Opinion Issued in PCT Application No. PCT/US21/014477", dated Apr. 7, 2021, 13 Pages.

"Discover the Difference Between Deep Learning Training and Inference", Retrieved from https://blog.exxactcorp.com/discover-difference-deep-learning-training-inference/, Aug. 10, 2017, 11 Pages.

Shkarlinska, Anna-Mariia, "Increasing the Accuracy of the Machine Learning Model in the CarLens Mobile App", Retrieved from: https://www.netguru.com/blog/improving-machine-learning-model-carlens-case-study, Apr. 12, 2019, 12 Pages.

Bharath, Raj, "Deep Learning on the Edge", Retrieved from: https://www.kdnuggets.com/2018/09/deep-learning-adge.html, Sep. 28, 2018, 11 Pages.

Cheng, et al., "IRotate: Automatic Screen Rotation Based on Face Orientation", In Proceedings of the SIGCHI Conference on Human Factors in Computing Systems, May 5, 2012, 8 Pages.

Fersman, et al., "Artificial Intelligence and Machine Learning in Next-Generation systems", In White Paper of Ericsson, Jun. 2018, 15 Pages.

Ning, Guanghan, "Start Training YOLO with Our Own Data", Retrieved from: https://web.archive.org/web/20190603132200/http://guanghan.info/blog/en/my-works/train-yolo/, Jun. 3, 2019, 22 Pages.

Han, et al., "Convergence of Edge Computing and Deep Learning: A Comprehensive Survey", In Journal of Computing Research Repository, Jul. 19, 2019, 29 Pages.

Kang, et al., "Offloading and Transmission Strategies for IoT Edge Devices and Networks", In Journal of Sensors, vol. 19, Issue 4, Feb. 18, 2019, pp. 1-17.

Debeasi, Paul, "Training Versus Inference", Retrieved from: https://blogs.gartner.com/paul-debeasi/2019/02/14/training-versus-inference/, Feb. 14, 2019, 5 Pages.

Wang, Angela, "Training the Amazon SageMaker Object Detection Model and Running it on AWS IoT Greengrass", Retrieved from https://aws.amazon.com/blogs/iot/sagemaker-object-detection-greengrass-part-2-of-3/, Nov. 27, 2019, 15 Pages.

Yazici, et al., "Edge Machine Learning: Enabling Smart Internet of Things Applications", In Journal of Big Data and Cognitive Computing, vol. 2, Issue 3, Sep. 3, 2018, pp. 1-17.

* cited by examiner

MACHINE LEARNING OPERATIONS ON DIFFERENT LOCATION TARGETS USING CAMERA ORIENTATION

BACKGROUND

Machine-learning (ML) engines are used in a wide variety of applications. In some ML systems, a ML model may be trained to detect or classify objects in images. For instance, ML models may be built to identify items in manufacturing facilities, retail establishments, or other facilities based on a labeled training set of images that contain the items.

However, training a ML model to identify objects accurately across various environments can be challenging. In particular, cameras capturing images for input to the ML model may be mounted in different locations resulting in a variety of fields of view, lighting conditions for the cameras may be different, objects that are to be identified may have different visual characteristics from one retail establishment to another, etc. These differences in the environments in which ML models are utilized may result in a ML model trained for one location being less effective for another location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for selecting a machine learning (ML) operating mode for a camera. A physical orientation of a housing of a camera is determined. In response to determining the physical orientation of the housing, an operating mode is selected from a set of operating modes. The set of operating modes includes at least a ML inference mode and a ML training mode. Based on the selected operating mode, images obtained by an image capturing unit coupled to the housing are processed. For instance, where the ML inference mode is selected, a ML controller applies a ML model to the images to infer or predict characteristics of the image (e.g., detecting objects within the images). Where the ML training mode is selected, the ML controller is configured to cause a ML model to be trained using images captured by the image capturing unit, the training occurring local to the camera or on a remotely located computing device. In this manner, the ML model may be trained more accurately based on actual images captured by the image capturing unit (rather than being trained solely on a training set of images from different environments), thereby improving the overall accuracy of ML predictions.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
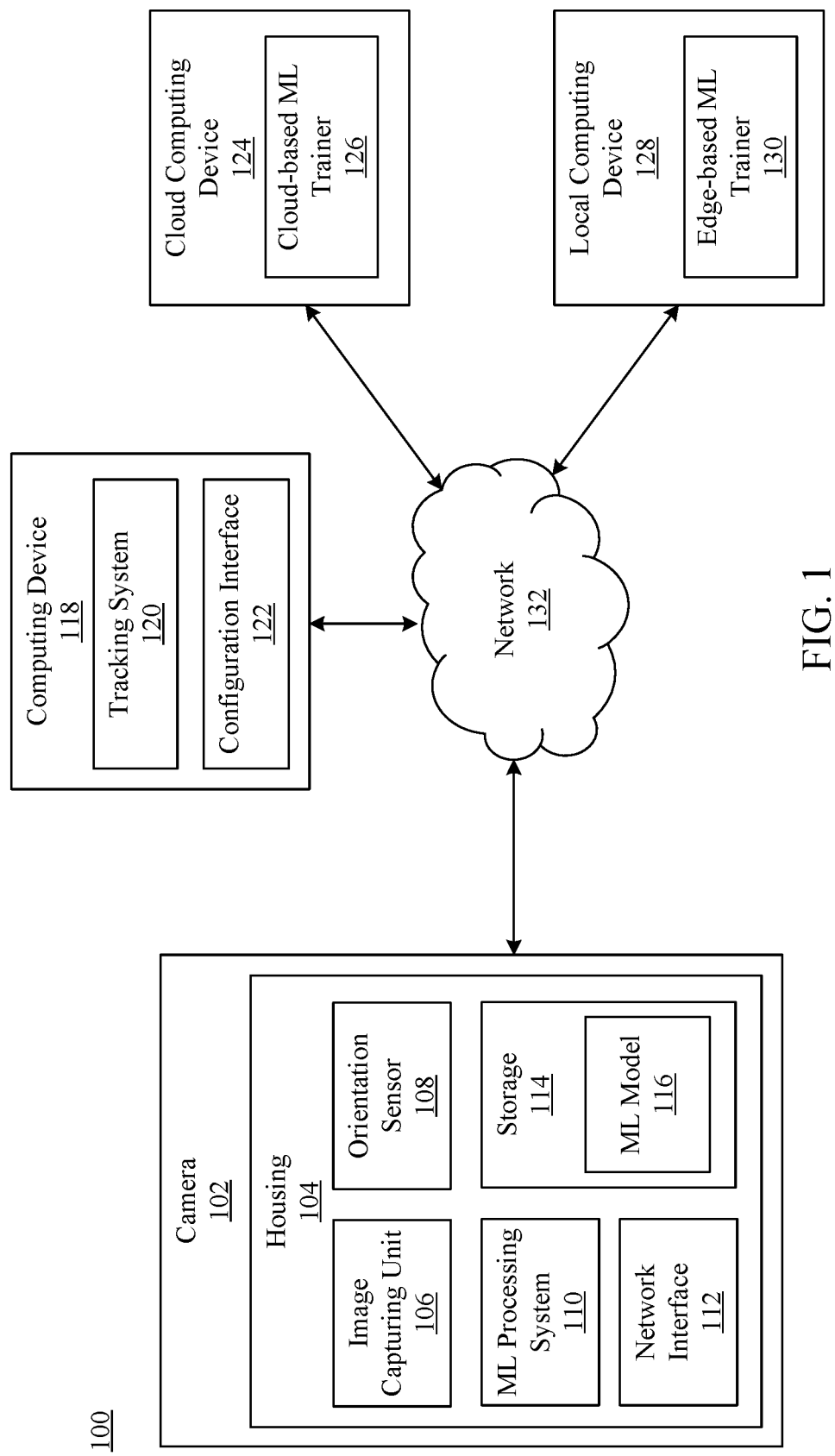
FIG. 1 shows a block diagram of a system for selecting a ML operating mode of a camera, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to selecting a ML operating mode for a camera. For instance, as described herein, a physical orientation of a housing of a camera is determined. In response to determining the physical orientation of the housing, an operating mode from a set of operating modes is selected. The set of operating modes includes at least a ML inference mode and a ML training mode. Based on the selected operating mode, images obtained by an image capturing unit coupled to the housing are processed. For instance, where the ML inference mode is selected, a ML controller applies a ML model to the images to infer or predict characteristics of the image (e.g., detecting objects within the images). Where the ML training mode is selected, the ML controller is configured to cause a ML model to be trained using images captured by the image capturing unit, either local to the camera or on a remotely located computing device. In this manner, the ML model may be trained more accurately based on actual images captured by the image capturing unit (rather than being trained solely on a training set of images from different environments), thereby improving the overall accuracy of ML predictions.

The embodiments described herein may advantageously improve the performance of ML models. In particular, inferences generated by such models are more accurate, as models can be selectively trained based on images captured in the environments in which the models will be utilized. Improving the accuracy of predictive ML models advantageously improves the functioning of computing devices, such as cameras on which such models are being executed. In particular, training models using images captured in the environments that the models will be utilized advantageously reduces consumption of processing resources of the computing devices applying those models, as application of the ML models do not unnecessarily waste valuable processing cycles analyzing features from training sets in different environments that are not useful in ML predictions. Instead, since the ML models are trained using based on images captured in the environments that the models will be applied, features that are more useful in terms of predictions are utilized, and therefore a more efficient use of processing resources is achieved while also improving accuracy of the predictions. Moreover, the storage requirement of such computing devices is also reduced, as features that may not be important (e.g., features from images captured in other environments) are no longer needed to be included during the ML training and inference stages.

Additionally, the systems (e.g., computing devices, applications, etc.) in which such models are implemented also perform more efficiently. For example, if a camera is being utilized to detect objects in a field of view based on application of a ML model, the processing burden placed on the systems are reduced, as the improved accuracy during training will reduce the number of incorrectly predicted items, resulting in a more accurate ML inference.

Moreover, any technological field in which such models are utilized are also improved. For instance, consider a scenario in which a predictive ML model is used in an industrial process, such as predictive maintenance or manufacturing. The ability to predict disruptions to the production line in advance of that disruption taking place, or analyze objects coming off a production line, is invaluable to the manufacturer. The manager is enabled to schedule the downtime at the most advantageous time and eliminate unscheduled downtime, as well as perform any appropriate adjustments to the manufacturing process more readily. Unscheduled downtime and faulty products can hit the profit margin hard and also can result in the loss of the customer base. It also disrupts the supply chain, causing the carrying of excess stock. A poorly-functioning ML model would improperly predict disruptions, and therefore, would inadvertently cause undesired downtimes that disrupt the supply chain.

Consider yet another scenario in which a ML model is used in a restaurant or other product-producing facility, where the ML model is used to track how many items are being made and/or sold. A camera mounted in the restaurant can capture images of a counter or the like where completed products are placed and log the number and/or frequency at which products are being made and/or sold. The ML model can allow a business to increase profits by advertising items that may not be selling as well, improving personnel efficiency during high demand times, updating product offerings, etc.

Consider yet another scenario in which an ML model is used in a retail establishment, such as in a self-checkout area of a retail business. A camera mounted near the self-checkout register may apply an ML model to detect items being scanned at the register, and be used to compare with the weights of those items to reduce the likelihood of theft or improper barcode labeling. By improving the accuracy of the model, items can be more accurately identified in self-checkout registers, potentially resulting in improved profit margins.

Consider yet another scenario in which a ML model is used for autonomous (i.e., self-driving vehicles). Autonomous vehicles can get into many different situations on the road. If drivers are going to entrust their lives to self-driving cars, they need to be sure that these cars will be ready for any situation. What's more, a vehicle should react to these situations better than a human driver would. A vehicle cannot be limited to handling a few basic scenarios. A vehicle has to learn and adapt to the ever-changing behavior of other vehicles around it. ML algorithms make autonomous vehicles capable of making decisions in real time. This increases safety and trust in autonomous cars. A poorly-functioning ML model may misclassify a particular situation in which the vehicle is in, thereby jeopardizing the safety of passengers of the vehicle.

Consider a further scenario in which a ML model is used in biotechnology for predicting a patient's vitals or whether a patient has a disease. A poorly-functioning ML model may misclassify the vitals and/or the disease. In such a case, the patient may not receive necessary treatment.

These examples are just a small sampling of technologies that would be improved with more accurate ML models.

As follows, example embodiments are described herein directed to techniques for selecting an operating mode of a camera. For instance, FIG. 1 shows a block diagram of a system 100 for selecting a ML operating mode of a camera, in accordance with an example embodiment. As shown in FIG. 1, system 100 includes a camera 102, a computing device 118, a cloud computing device 124, and a local computing device 128 coupled via a network 132. Camera 102 includes a housing 104 that includes an image capturing unit 106, an orientation sensor 108, a ML processing system 110, a network interface 112, and a storage 114. Storage 114 includes a ML model 116 stored therein. As will be described in greater detail below, ML processing system 110 is configured to operate according to a selected operating mode, and may apply ML model 116 to images captured by image capturing unit 106 during a ML inference mode, or cause ML model 116 to be trained using images obtained from image capturing unit 106. Computing device 118 includes a tracking system 120 and a configuration interface 122. Cloud computing device 124 includes a cloud-based ML trainer 126. Local computing device 128 includes an edge-based ML trainer 130. An example computing device that may incorporate the functionality of camera 102, computing device 118, cloud computing device 124, and/or local computing device 128 (or any subcomponents therein) is discussed below in reference to FIG. 7. System 100 may comprise any number of devices, including those illustrated in FIG. 1 and optionally one or more further devices or components not expressly illustrated. System 100 is further described as follows.

Network 132 may include one or more of any of a local area network (LAN), a wide area network (WAN), a personal area network (PAN), a combination of communication networks, such as the Internet, and/or a virtual network. In example implementations, camera 102, computing device 118, cloud computing device 124, and/or local computing device 128 may be communicatively coupled to each other via network 132. In an implementation, any one or more of camera 102, computing device 118, cloud computing device 124, and/or local computing device 128 may communicate via one or more application programming interfaces (API) and/or according to other interfaces and/or techniques. Camera 102, computing device 118, cloud computing device 124, and/or local computing device 128 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Camera 102 may comprise any device for capturing images, or a series of images (e.g., videos) in any environment. In some implementations, camera 102 is part of, or integrated with, a computing device that includes a processor(s), storage device(s), operating system(s), application(s), etc. that are used to analyze images captured by camera 102. Accordingly, camera 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device (e.g., a head-mounted device including smart glasses such as Google® Glass™ etc.), or other type of mobile device, or a stationary computing device such as a desktop computer or PC (personal computer), or a server. In some illustrative embodiments, camera 102 may comprise a device that is mounted or otherwise affixed to another structure, such an enclosure, a cabinet, wall, floor, ceiling, building, equipment, cash register, pole, etc. For instance, camera 102 may security camera, commercial camera, industrial camera, etc. Camera 102 may interface with other devices (e.g., local or remote computing devices) through one or more application programming interfaces (APIs) and/or by other mechanisms. Note that any number of program interfaces may be present.

Figure 4A:
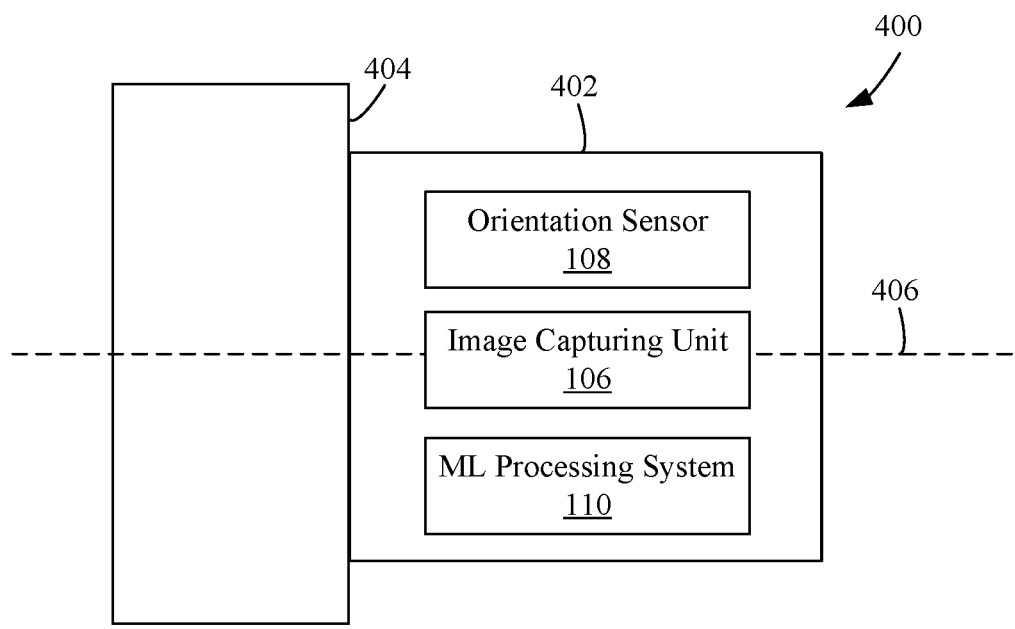
FIGS. 4A and 4B show illustrative camera systems that may be used to implement various embodiments.
Figure 4B:
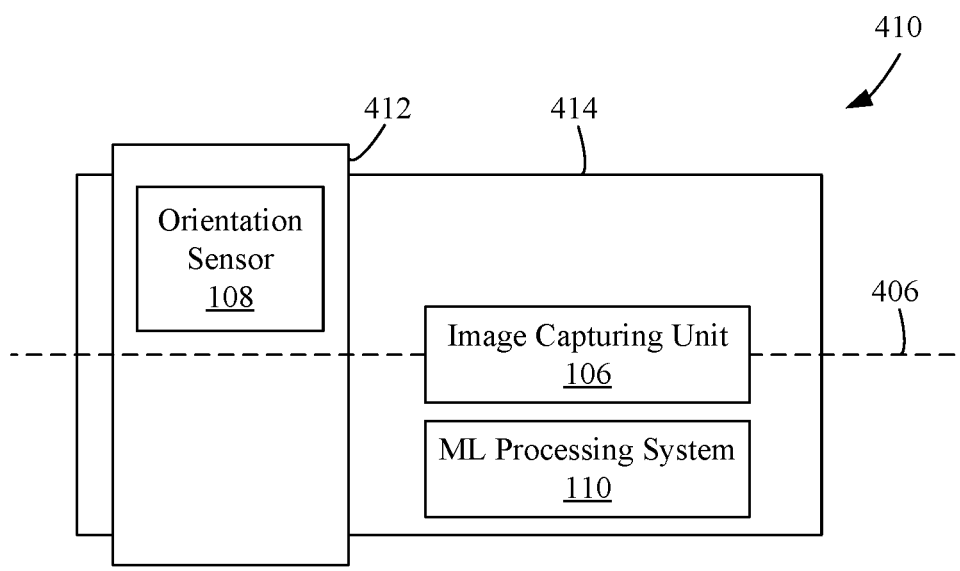

Housing 104 may comprise any suitable housing for any components of camera 102, including any components illustrated in FIG. 1, and/or any additional components not expressly illustrated. For instance, image capturing unit 106, orientation sensor 108, ML processing system 110, network interface 112, and/or storage 114 may be coupled to one or more circuit boards that are located within housing 104. Housing 104 may be designed in any shape, size, and/or configuration, and may be made from any suitable material such as a metal, plastic, or combination thereof. In some examples, housing 104 is dust-proof and/or waterproof. Housing 104 may also include one or more camera mounts that may be used to attach the housing to another structure as described herein. Camera mounts can include, but are not limited to, a mounting portion (e.g., a camera base) that has holes (e.g., for receiving screws, bolts, nails, etc.), brackets, clips, adhesives, etc. for attaching the housing to a separate structure. Housing 104 may include the camera mount(s) integrated within a single housing unit or may be attached as a separate housing portion. Illustrative arrangements depicting housing 104 are shown in FIGS. 4A-4B, described in greater detail below.

Image capturing unit 106 includes any type of image sensor, such as an image sensor array (e.g., charged coupled device (CCD), complementary metal oxide semiconductor (CMOS), etc.), capable of capturing images at any frame rate. In an embodiment, image capturing unit 106 is configured to capture images at a frame rate of 15 frames per second (fps), 30 fps, 60 fps, 120 fps, 240 fps, or higher. In other examples, image capturing unit 106 may be configured to capture images at predetermined intervals, when an object is detected in a field of view of image capturing unit 106, in response to a user-initiated trigger, etc. Image capturing unit 106 may comprise any shape (e.g., round, square, rectangular, etc.) and be configured to capture images at any aspect ratio. As explained herein, image capturing unit 106 may be positioned in such a manner such that it captures objects within a desired field of view, such as objects in a retail checkout area, a manufacturing line, a fast food restaurant, etc.

Orientation sensor 108 comprises any device or component that can detect an orientation of housing 104 (or a portion thereof) and output the detected orientation. In some implementations, orientation sensor 108 may be configured to detect and output a change in orientation of housing 104. Orientation sensor 108 may detect the orientation in various ways, such as by detecting that housing 104 has not been rotated from a default or initial position, rotated 90 degrees, 180 degrees, and/or 270 degrees. It is noted and understood that orientation sensor 108 is not limited to detecting only 4 orientations of housing 104, but may be configured to detect less than or greater than 4 orientations. In some implementations, orientation sensor 108 comprises a standalone sensor that detects a positioning of housing 104. In other implementations, orientation sensor 108 may include a combination of any one or more of an acceleration sensor or accelerometer, a gyroscope, a geomagnetic sensor, a magnetometer, a compass, a tilt sensor, and/or other positioning sensors. In yet other examples, orientation sensor 108 may be implemented as a software component that combines inputs from various physical positioning sensors (e.g., accelerometer, gyroscope, etc.) to determine an orientation of housing 104. In still other examples, orientation sensor 108 may comprise a series of electrically conductive portions or contacts (e.g., switches), such that when a first portion of housing 104 is rotated with respect to another portion of housing 104, activation of a particular conductive coupling can be detected that correlates to a respective orientation.

In yet other examples, orientation sensor 108 is configured to determine or infer an orientation of housing 104 based on one or more images captured by image capturing unit 106. For instance, orientation sensor 108 may infer an orientation by determining that certain objects (e.g., known or expected objects in the camera's field of view) have been rotated, which may indicate that housing 104 has been rotated. These examples are only illustrative, and orientation sensor 108 may include any other suitable component for detecting a physical orientation of housing 104.

As described in greater detail below, ML processing system 110 is configured to process images captured by image capturing unit 106 according to a ML operating mode selected from a set of operating modes. For instance, based on an orientation of housing 104 determined by orientation sensor 108, ML processing system 110 may process images in accordance with a ML inference mode or an ML training mode. In an ML inference mode, ML processing system 110 may generate a prediction for an image captured by image capturing unit 106, such as detecting and identifying an object in a captured image by application of ML model 116. In an ML training mode, ML processing system 110 may cause ML model 116 to be trained in various ways, such as by a ML trainer located within camera 102, a ML trainer located on a computing device local to camera 102 (e.g., local computing device 128), and/or a ML trainer located on a computing device located remote from camera 102 (e.g., cloud computing device 124). ML processing system 110 may comprise any suitable processor for carrying out operations as described herein, such as a central processing unit, a graphics processing unit, a field programmable gate array (FPGA) device, an application-specific integrated circuit (ASIC device), etc. Additional details relating to the selection of the ML operating mode in accordance with the orientation of housing 104 will be described in further detail below.

Storage 114 comprises one or more storage devices located within (e.g., integral to) housing 104, or affixed thereto. Storage 114 may include as physical storage devices (e.g., hard disk drives, flash drives, solid-state drives, optical disk drives, RAM devices, etc.) for storing any one or more of an operating system, applications, software, etc. for capturing and/or processing images obtained by image capturing unit 106. For instance, storage 114 may store ML model 116 therein, which may be applied to images during an ML inference mode to detect and identify objects. As will be described in greater detail below, storage 114 may also store images and/or associated metadata captured by image capturing unit 106 in some implementations that may be used during an ML inference and/or ML training mode.

Network interface 112 is any suitable interface that enables communications between camera 102 and devices located external to camera 102, such as computing device 118, cloud computing device 124, local computing device 128, or any other device not expressly illustrated. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. In some implementations, when ML processing system 110 is operating in a ML inference mode and an object has been identified in an image captured by image capturing unit 106 by applying ML model 116, the identification of the object can be transmitted via network interface 112 to another computing device (e.g. computing device 118) for tracking or logging purposes. In other implementations, network interface 112 may transmit via network interface 112 an image (or a set of images) captured by image capturing unit 106 to one or more other computing devices for training an ML model external to camera 102. Upon the ML model being trained, network interface 112 may receive the ML model and store it in storage 104, which may be used during an ML inference stage.

Computing device 118 includes any one or more computing device of one or more users (e.g., individual users, family users, enterprise users, governmental users, etc.) that may comprise one or more applications, operating systems, virtual machines, storage devices, etc. that may be used to track inferences made by camera 102 and/or configure various aspects of camera 102 (e.g., ML processing system 110 contained therein). For instance, tracking system 120 of computing device 118 may receive an identification of objects detected at a location of camera 102 by application of ML model 116, along with one or more items of associated information (e.g., the time that the object was detected, a transaction number, a location identifier, etc.) for tracking or logging the object. Configuration interface 122 may be invoked on computing device 118 (e.g., via a browser by navigation to a web page) through which a user may configure various features relating to camera 102, including but not limited to ML processing system 110 and/or training of ML model 116, as described herein. As examples, configuration interface 122 may be utilized by user to provide labels for images during one or more training modes described herein, identifying which camera or cameras ML model 116 should be deployed upon training, or any management configuration of camera 102. In some other examples, configuration interface 122 may also be utilized to selectively enable or disable certain operation modes, such as operation modes where images captured by image capturing unit 106 may be transmitted to any device external to camera 102, to comply with privacy regulations (e.g., General Data Protection Regulation (GDPR), or other laws, rules, or regulations).

It is noted and understood that tracking system 120 and configuration interface 122 need not be located or accessible via the same computing device, but may be located or accessible via a plurality of computing devices (e.g., separate devices) not expressly illustrated. Further, computing device 118 may be located local to camera 102 (e.g., in the same facility or building), located remotely (e.g., in a data center, such as in a company's headquarters), and/or in the cloud. For instance, computing device 118 may include any number of computing devices, including tens, hundreds, or even thousands of computing devices. Computing devices of computing device 118 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 118 is not limited to a physical machine, but may include other types of machines or nodes, such as a virtual machine. Computing device 118 may interface with other components illustrated in FIG. 1 through APIs and/or by other mechanisms.

Cloud computing device 124 may comprise any number of devices or servers, such as a network-accessible server (e.g., a cloud computing server network). For example, cloud computing device 124 may comprise a group or collection of servers (e.g., computing devices) that are each accessible by a network such as the Internet (e.g., in a "cloud-based" embodiment) to store, manage, and process data. In accordance with embodiments described herein, cloud-based ML trainer 126 is configured to receive image captured by image capturing unit 106 and ML model 116 based on the images and the objects contained therein. Upon training ML model 116, cloud-based ML trainer 126 may transmit the ML model to camera 102 (and/or other cameras not expressly shown), which may then apply the received ML model during a ML inference stage. In example embodiments, cloud computing device 124 is a computing device that is located remotely (e.g., in a different facility) from camera 102 and communicatively coupled via network 132.

Cloud computing device 124 may comprise any number of computing devices, and may include any type and number of other resources, including resources that facilitate communications with and between servers, storage by the servers, etc. (e.g., network switches, storage devices, networks, etc.). In an embodiment, devices of cloud computing device 124 may be co-located (e.g., housed in one or more nearby buildings with associated components such as backup power supplies, redundant data communications, environmental controls, etc.) to form a datacenter, or may be arranged in other manners. Accordingly, in an embodiment, cloud computing device 124 may be a datacenter in a distributed collection of datacenters.

Local computing device 124 may comprise any number of devices or servers that is located local to camera 102. For instance, local computing device 128 may be located in the same building or facility, or coupled to the same local network, as camera 102. As an illustration, local computing device 102 may comprise an edge device that is co-located on the same premises as camera 102, such that communications between camera 102 and local computing device 124 may be carried out without transmitting information over a wider network, such as the Internet. As described earlier, local computing device 124 includes edge-based ML trainer 130. In accordance with embodiments described herein, edge-based ML trainer 130 is configured to receive image captured by image capturing unit 106 and ML model 116 based on the images and the objects contained therein. Upon training ML model 116, edge-based ML trainer 130 may transmit the ML model to camera 102 (and/or other cameras not expressly shown), which may then apply the received ML model during a ML inference stage.

It is noted and understood that implementations are not limited to the illustrative arrangement shown in FIG. 1. Rather, system 100 comprise any number of cameras and/or computing devices coupled in any manner.

Figure 2:
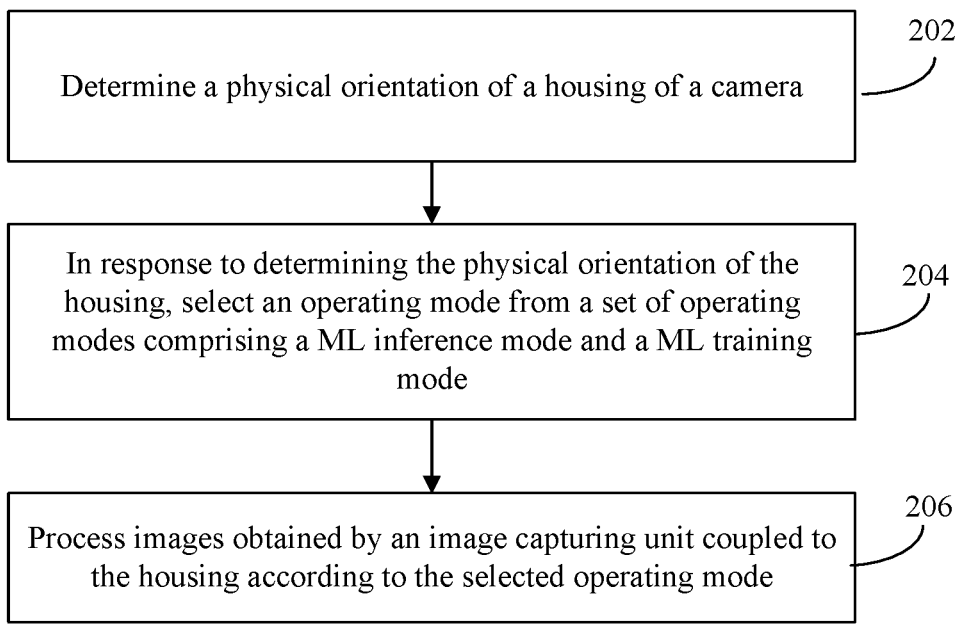
FIG. 2 shows a flowchart of a method for processing images obtained by an image capturing unit according to a selected ML operating mode, in accordance with an example embodiment.

Camera 102 may be operated in various ways based at least on a camera orientation. For instance, operation of camera 102 may be carried out according to FIG. 2. FIG. 2 shows a flowchart 200 of a method for processing images obtained by an image capturing unit according to a selected ML operating mode, in accordance with an example embodiment. For illustrative purposes, flowchart 200 and camera 102 are described as follows with respect to FIG. 3.

Figure 3:
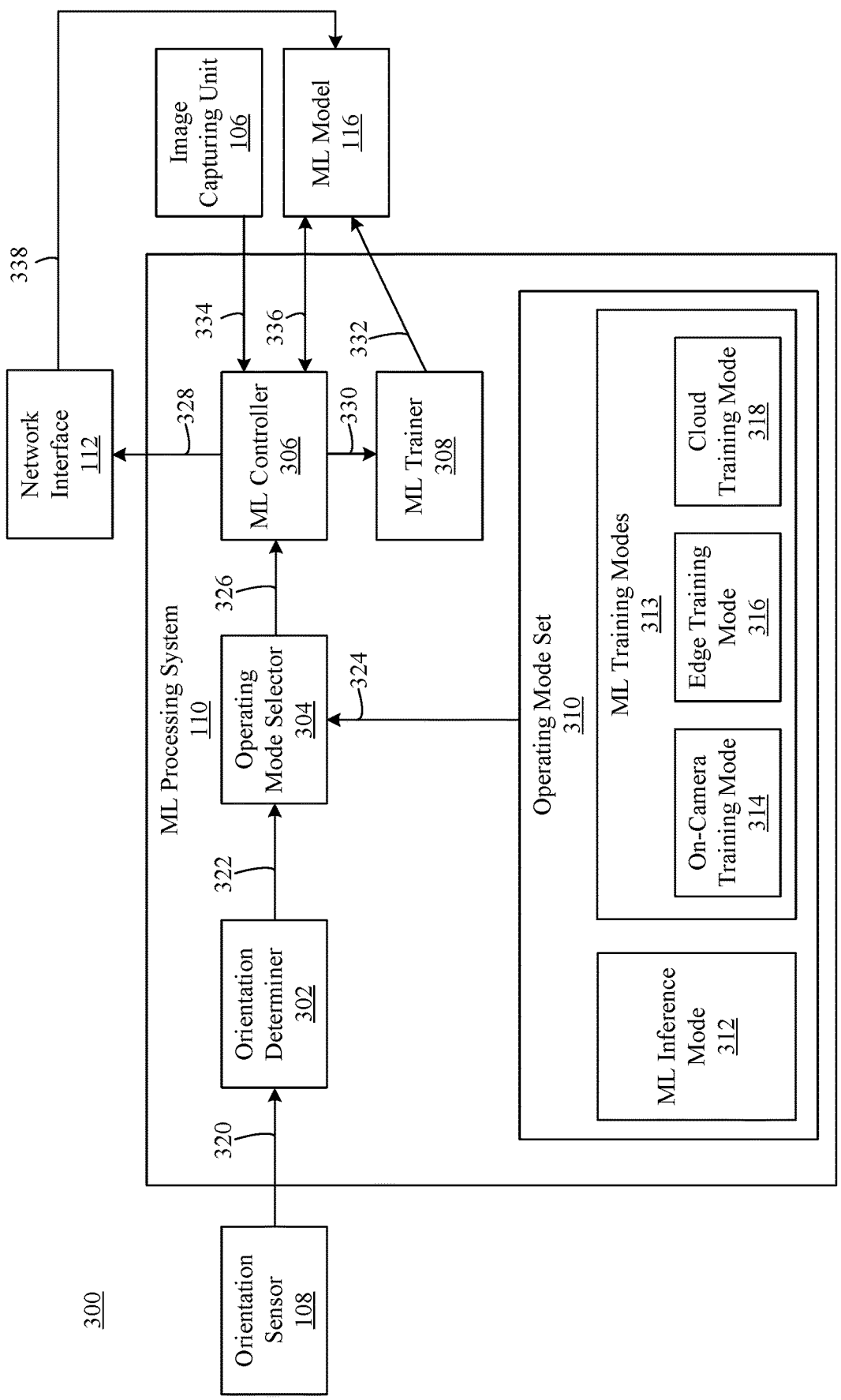
FIG. 3 shows a block diagram of a system for selecting a ML operating mode, in accordance with an example embodiment.

FIG. 3 shows a block diagram of a system 300 for selecting a ML operating mode of a camera, in accordance with an example embodiment. As shown in FIG. 3, system 300 includes an example implementation of image capturing unit 106, orientation sensor 108, ML processing system 110, network interface 112, and ML model 116. ML processing system 110 includes an orientation determiner 302, an operating mode selector 304, a ML controller 306, a ML trainer 308, and an operating mode set 310. Operating mode set 310 includes a plurality of operating modes that may be selected, including ML inference mode 312 and one or more ML training modes 313. ML training modes 313 include an on-camera training mode 314, an edge training mode 316, and a cloud training mode 318. Any number and combination of modes 312, 314, 316, and 318 may be included in operating mode set 310 (as well as additional types of modes). Flowchart 200 and system 300 are described in further detail as follows.

Flowchart 200 of FIG. 2 begins with step 202. In step 202, a physical orientation of a housing of a camera is determined. For instance, with reference to FIG. 3, orientation determiner 302 is configured to obtain 320 orientation information from orientation sensor 108 that indicates a physical orientation of housing 104. The orientation information may indicate a rotational position of housing 104, a change in a rotational position from a previous rotational position, or any other information that may be used to indicate a physical orientation of housing 104.

Based at least on the information obtained from orientation sensor 108, orientation determiner 302 determines a physical orientation of housing 104. The physical orientation may comprise one of a plurality of predetermined orientations, such as any number of predetermined rotational positions around an axis (e.g., 0 degrees, 90 degrees, 180 degrees, and/or 270 degrees). Although example embodiments are described in which orientation determiner 302 may be configured to determine a physical orientation of housing 104 as a rotational position, other types of orientation changes can also be determined, such as lateral changes along an axis (e.g., where orientation sensor 108 is configured as a slider that indicates a lateral movement).

In some implementations, orientation determiner 302 is configured to determine a physical orientation of a first portion of housing 104 that is movable relative to a second portion of housing 104. For instance, housing 104 may include separate components that are movably attached to each other, such as a first portion that is a movable portion that may be rotatable around an axis relative to a second portion that is a fixed portion (e.g., a portion of housing 104 that may be mounted to another structure), where the physical orientation of the housing comprises a physical orientation (e.g., a rotational position) of the first housing portion relative to the second housing portion. In some examples, the movable portion may contain image capturing unit 106, orientation sensor 108, ML processing system 110, network interface 112, and/or storage 114, while the fixed portion comprises a mounting bracket or the like. Other configurations are also contemplated, such as where a fixed portion may include one or more of the aforementioned components of camera 102.

In yet other examples, the second housing portion need not be fixed or configured to be mounted to a structure. Rather, in such examples, the second housing portion may be movable part of housing 104, such as a slider or a ring, that is movably attached to a first housing portion. Example configurations are illustrated in FIGS. 4A-4B, which will be described in greater detail below.

In yet other examples, housing 104 need not comprise any externally movable components, such as where camera 102 is a smartphone or a tablet. In such examples, orientation determiner 302 may obtain a physical orientation of housing 104 based on orientation sensor 108 included within housing 104 that may detect when housing 104 is rotated or otherwise positioned in a different physical orientation.

In step 204, in response to determining the physical orientation of the housing, an operating mode is selected from a set of operating modes that comprise an ML inference mode and a ML training mode. For instance, with reference to FIG. 3, operating mode selector 304 is configured to select a particular operating mode from among operating mode set 310 in response to operation determiner 302 determining the physical orientation of housing 104. In other words, based on the physical orientation of housing 104 received 322 from orientation determiner 302, operating mode selector 304 may select 324 a different operating mode from a set of predetermined operating modes. The selected operating mode may be ML inference mode 312, or one of a plurality of ML training modes 313 that include on-camera training mode 314, edge training mode 316, and cloud training mode 318.

In examples, ML inference mode 312 comprises a mode during which ML inferences may be generated for images captured by image capturing unit 106 by applying ML model 116. For instance, ML model 116, which is stored in storage 114 included within housing 104, may be applied to each image to detect and/or identify objects contained therein. On-camera training mode 314 comprises a mode during which ML trainer 308 located within housing 104 trains (or re-trains) ML model 116 using images captured by image capturing unit 106. In on-camera training mode 314, for instance, such images captured by image capturing unit 106 need not be transmitted to computing devices external to camera 102 for training ML model 116, but rather, ML trainer 308 may train ML model 116 using ML controller 306 also located in housing 104. Edge training mode 316 comprises a mode during which images captured by image capturing unit 106 are transmitted to local computing device that is co-located with camera 102 (e.g., on the same premises) where ML model 116 may be trained and deployed to camera 102 upon training. Cloud training mode 318 comprises a mode similar to edge training mode, except images captured by image capturing unit are transmitted to cloud computing device (e.g., a remote network-accessible device) that is remotely located from camera 102 for training ML model 116. Further details regarding each of these modes will be described below with reference to FIG. 5.

In step 206, images obtained by an image capturing unit coupled to the housing are processed according to the selected operating mode. For instance, with reference to FIG. 3, ML controller 306 processes images obtained by image capturing unit 106 according to the operating mode selected 326 by operating mode selector 304. For example, when ML inference mode 312 is selected, ML controller 306 may apply ML model 116 stored in camera 102 to the images to generate ML inferences (e.g., to identify objects within the captured images). When operating mode selector 304 selects on-camera training mode 314, ML controller 306 may cause 330 ML trainer 308 located within camera 102 to train 332 ML model 116 using the captured images. Where operating mode selector 304 selects edge training mode 316, ML controller 306 may transmit 328 an image (or a set of images), via network interface 112, to local computing device 128 for training ML model 116. Similarly, where operating mode selector 304 selects cloud training mode 318, ML controller 306 may transmit 328 an image (or set of images), via network interface 112, to cloud computing device 124 for training ML model 116.

Training of ML model 116, either by ML trainer 306, cloud-based ML trainer 126, and/or edge-based ML trainer 130, may be carried out in various ways as appreciated to those skilled in the relevant arts. For instance, ML trainer 306, cloud-based ML trainer 126, and/or edge-based ML trainer 130 may train ML model 116 using a neural network, such as an artificial neural network (ANN) or a deep neural network (DNN), using artificial intelligence (AI) techniques, or any other suitable model training technique. Examples of such networks that may be used to train ML model 116 include, but are not limited to, MobileNet and MobileNet SSD, although other techniques are also contemplated. Furthermore, ML model 116 may be trained using any suitable architecture, such as a transfer learning script provided by TensorFlow®.

When ML controller 306 is directed operate in one of ML training modes 313, ML controller 306 may cause one or more images captured by image capturing unit 106 to be stored prior to training ML model 116. In some implementations, ML controller 306 may store a predetermined number of images prior to training ML model 116. For instance, ML model 116 may be trained after a minimum number of images have been captured. Such a predetermined number of images may be configured via configuration interface 122. Where on-camera training mode 314 is selected, ML trainer 308 may be configured to wait for the minimum number of images to be captured prior to training ML model. In other scenarios, such as where one of edge training mode 316 or cloud training mode 318 is selected, ML controller 306 may await capturing of a minimum number of images prior to transferring the images to local computing device 128 or cloud computing device 124 for training ML model 116. In other examples, ML controller 306 may transfer images to local computing device 128 or cloud computing device 124 based on the selected training mode upon capture of each image, and edge-based ML trainer 130 or cloud-based ML trainer 126 may wait training ML model 116 until the minimum number of images have been received. Once the minimum number of images have been obtained, the appropriate ML trainer (e.g., ML trainer 308, edge-based ML trainer 130 or cloud-based ML trainer 126) may a suitable training script, such as a transfer learning script, to train ML model 116 with the new images and redeploy the model to one or more cameras for use in a ML inference mode. Although it has been described herein that training may be performed on a set of images that have been stored on and/or transferred to camera 102, local computing device 128, or cloud computing device 126, implementations are not so limited. It is also contemplated that training may be performed based on a real-time or near real-time feed of image capturing unit 106, or on an image-by-image basis.

In some further implementations, in response to selection of an operating mode in which ML training is performed on a device external to camera 102, ML controller 106 may also be configured to initiate a network session with a computing device external to the camera where training will be occurring. For instance, in response to selecting edge training mode 316, ML controller 106 may cause network interface 112 to initiate a network session with local computing device 128, such that one or more images may be transmitted from camera 102 to local computing device 128 for external training of ML model 116. Similarly, in response to selecting cloud training mode 318, ML controller 106 may cause network interface 112 to initiate a network session with cloud computing device 1248, such that one or more images may be transmitted from camera 102 to cloud computing device 124 for external training of ML model 116. Initiation of a network session may include, but is not limited to, initiating a new network connection, starting a session during with network transmissions may occur between the devices, altering a network state of camera 102 from a sleep or standby state to an active state, or any other change in state of network interface 116 to enable camera 102 to transmit images to an external computing device and/or receive ML model 116 upon completion of training.

In the disclosed manner, different ML operating modes may be selected based on a physical orientation of housing 104. In other words, by integrating the mode selection with a camera housing orientation, a simpler and less cumbersome manner of switching between different modes of operation of camera 102 is enabled, such as an ML inference mode or one of a plurality of ML training modes that each have a different training location. Furthermore, such techniques enable mode selection to be triggered based on an industrial design of the camera which may allow for greater ease of use and reduced user training to switch a camera's operating mode. By allowing for a more streamlined approach in switching ML operating modes of a camera, ML model 116 may be trained more easily for the environment that camera 102 is located, such as in a retail establishment, fast food restaurant, factory, etc., resulting in more accurate ML inferences once the model is trained.

As an illustration, when an ML inference mode 312 is selected for a camera located in a self-checkout register (or any other type of checkout register) in a retail establishment, camera 102 may be enabled to more accurately identify objects that are being purchased by applying ML model 116. If a particular item that was identified by ML controller 306 through application of ML model 116 does not match a corresponding weight range for item that was scanned at the register, ML controller 306 may optionally generate a warning or the like indicating that a scanning error has occurred.

In another illustrative example, if a new product is added to a retail store's inventory, a user may select the appropriate orientation of housing 104 (depending on the desired ML training location target) to train ML model 116 to learn the new product. In such examples, a user may rotate the camera housing, scan one or more images of the new product, and allow ML model 116 to be trained to identify the new product.

FIGS. 4A-4B show illustrative camera systems that may be used to implement various embodiments described herein. For instance, system 400 of FIG. 4A shows a camera housing having a first housing portion 402, a second housing portion 404, and an example implementation of image capturing unit 106, orientation sensor 108, and ML processing system 110. It is noted and understood that system 400 may include other components not expressly illustrated, such as components and/or subcomponents illustrated 408003-US-NP in camera 102 of FIG. 1, and ML processing system 110 of FIG. 3. As shown in FIG. 4A, first housing portion 402 may be rotated relative to second housing portion 404 around an axis 406. The axis 406 may pass through a center of image capturing unit 106, although example embodiments are not limited to that implementation. In accordance with techniques described herein, when it is desired that the camera be operated in a certain mode, first housing portion 402 can be rotated around axis 406 relative to second housing portion 404. In this illustrative arrangement, first housing portion 402 includes image capturing unit 106 affixed to an interior thereof, such that when the first housing portion is rotated, image capturing unit 106 also rotates around axis 406 when first housing portion 402 is rotated around axis 406. Orientation sensor 108 may detect the physical orientation of first housing portion 402, and ML processing system 110 may select the appropriate ML operating mode from a set of ML operating modes in response.

FIG. 4B depicts another illustrative system 410 in which techniques described herein may be implemented. As shown in FIG. 4B, system 410 includes a housing portion 412, a housing portion 414, and an example implementation of image capturing unit 106, orientation sensor 108, and ML processing system 110. In the illustrative arrangement shown in FIG. 4B, housing portion 412 may comprise a ring or other movable portion of a camera housing with respect to housing portion 414. In some implementations, housing portion 412 is rotatable around an axis 406 of a camera, but other implementations are also contemplated (e.g., lateral movement along the axis). In the illustrative arrangement shown in FIG. 4B, when housing portion 412 is rotated, housing portion 414 does not rotate. As a result, image capturing unit 106 affixed to an interior of housing portion 414 similarly does not rotate, thereby preserving the field of view of the image capturing unit. As depicted in FIG. 4B, housing portion 412 comprises orientation sensor 108, such that when housing portion 412 is rotated, an orientation thereof (e.g., a rotational position) can be detected, upon which ML processing system 110 may select a corresponding ML operating mode from a set of predetermined operating modes. It is understood and appreciated that the examples shown in FIGS. 4A and 4B are only illustrative, and not meant to limit the scope of example embodiments described herein.

Figure 5:
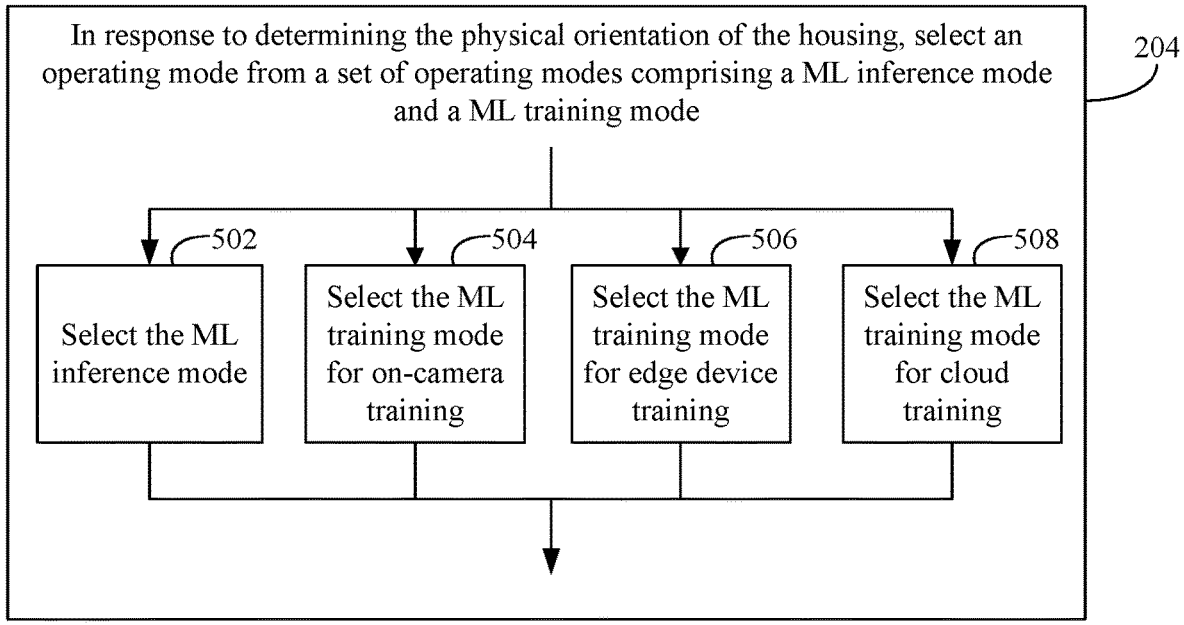
FIG. 5 shows a flowchart of a method for selecting an operating mode from a set of operating modes, in accordance with an example embodiment.

As described above, an operating mode for a camera may be selected based on a physical orientation of a camera housing. For example, FIG. 5 shows a flowchart of a method for selecting an operating mode from a set of operating modes, in accordance with an example embodiment. In an implementation, the method of flowchart 500 may be implemented by operating mode selector 304 and/or ML controller 306. FIG. 5 is described with continued reference to FIGS. 1 and 3. Other structural and operational implementations will be apparent to persons skilled in the relevant art(s) based on the following discussion regarding flowchart 500, system 100 of FIG. 1, and system 300 of FIG. 3.

Flowchart 500 begins with step 502. In step 502, the ML inference mode is selected. For instance, with reference to FIG. 3, operating mode selector 304 selects ML inference mode 312 in response to orientation determiner 302 determining a physical orientation of housing 104. Selection of ML inference mode 312 may cause ML controller 306 may receive 334 images captured by image capturing unit 106 and apply 336 ML model 116 to the images generate a predicted output for each image. The predicted output for each image may comprise a detection and/or identification of an object within each image, such as identification of an item passing through a checkout register, a food item prepared in a restaurant, a product coming off a manufacturing line, etc. In some examples, in response to detection of such an item, ML controller 306 may cause an indication of the identification may be provided to tracking system 120 via network interface 112 where logging of the item and associated characteristics (e.g., a time of the identification) may be performed, to a local system (e.g. to generate an alert), or to any other device local or remote to camera 102.

It is noted that when ML inference mode 312 is selected to generate predicted outputs for images captured by image capturing unit 106, ML controller 306 may apply ML model 116 that is stored in storage 114 within housing 104. In other words, during operation in ML inference mode 312, images captured by image capturing unit 106 need not be transmitted outside of camera 102, but instead, inferences may be made within camera 102 and appropriate indications may be provided in response to the generated inferences. In some further examples, ML controller 306 does not store images captured by image capturing device 106 after applying ML model 116 during the ML inference mode. Instead, once the ML inference is generated, the image can be deleted from camera 102, thereby conserving storage resources on the device.

ML controller 306 may apply ML model 116 to generate inferences in various ways, as will be appreciated by those skilled in the relevant arts. For instance, when an image is captured in which an ML inference is to be generated, ML controller 306 may perform one or more operations (e.g., image analysis operations, thresholding operations, cropping operations, etc.) to extract various features of the image (e.g., color features, contrast features of the image. The features may be provided as an input to ML model 116, and ML model 116 may generate a predicted label associated with the image, such as an identification of an object detected in the image. In some implementations, ML model 116 also provides a confidence value associated with the generated inference that may be a value between 0.0 and 1.0, where a relatively lower value is associated with a lower confidence level and a relatively higher value is associated with a higher confidence value. If the confidence level is above or equal a predetermined threshold, ML controller 106 may determine that the generated inference is sufficiently accurate and may locally store and/or pass the generated inference to another device (e.g., computing device 118). If the confidence level is below the predetermined threshold, ML controller 106 may determine that the generated inference is not sufficiently accurate, and may discard the inference.

It is also noted that ML model 116 applied during operation in ML inference mode 312 may be trained in any manner, including by ML trainer 308 on the camera device in which inferences are being generated. In some other examples, ML model 116 may be received from any other device, including but not limited to another camera, cloud computing device 124, local computing device 128, or any other device where ML model 116 was trained or retrained.

In step 504, the ML training mode for on-camera training is selected. For instance, with reference to FIG. 3, operating mode selector 304 selects on-camera training mode 314 in response to orientation determiner 302 determining a physical orientation of housing 104. Selection of on-camera training mode 314 may cause ML controller 306 to trigger on-camera training of ML model 116. In other words, during operation of camera 102 in on-camera training mode 314, ML trainer 308 may train ML model 116 that is stored in storage 114 within housing 104 using images captured by image capturing unit 106.

Because operation of camera 102 in on-camera training mode 314 triggers local training within camera 102, images need not be transmitted outside of the camera for training. Rather, once a minimum number of images (e.g., 100 images) has been captured by image capturing unit 106 and stored in storage 114, ML trainer 308 within the camera housing can train ML model 116 using one or more processor or hardware accelerators (e.g., CPUs, GPUs, FPGAs, ASICs, etc.) also within housing 104 by running an appropriate training script as described herein. Once training is complete, ML model 116 is stored in storage 114 (which may then be used when camera 102 is later operated in ML inference mode 312) and the images used for training ML model 116 may be deleted from storage 114. It is also noted that in some implementations, ML model 116 trained by ML trainer 308 may also be deployed to other cameras (not shown), such that the model trained by one camera can be utilized by other cameras, potentially eliminating the need for additional model training (thereby reducing storage and/or processing resources).

In step 506, the ML training mode for edge device training is selected. For instance, with reference to FIG. 3, operating mode selector 304 selects edge training mode 316 in response to orientation determiner 302 determining a physical orientation of housing 104. Selection of edge training mode 316 may cause ML controller 306 to transmit images captured by image capturing unit 106, via network interface 112, to local computing device 128 for training ML model 116. As described earlier, local computing device 128 may comprise a computing device that is external to camera 102, but located locally (e.g., a back room server in the same facility or on the same premises, a computing device owned by the same entity as camera 102, etc.). In some implementations, camera 102 and local computing device 128 are co-located with each other. In yet some other implementations, local computing device 128 may comprise an edge computing device that is present on the same LAN as camera 102, such that images may be transmitted from camera 102 to local computing device 128 over the LAN.

Upon transmitting images to local computing device 128, edge-based trainer 130 may be configured to run the appropriate ML training script to train ML model 116. Since local computing device 128 may have increased memory and processing resources compared to camera 102, training may be performed not only on a higher number of captured images (e.g., 1000 images or more), but also with increased processing efficiencies. Thus, where on-camera training may not be ideal due to limited computing resources on camera 102, edge-based ML trainer 130 may be utilized to train ML model 116. Upon training ML model 116, edge-based ML trainer 130 may deploy 338 ML model 116 to one or more other devices, such as camera 102 which provided the images for training the model, and/or any other cameras where ML inferences are to be performed.

In step 508, the ML training mode for cloud training is selected. For instance, with reference to FIG. 3, operating mode selector 304 selects cloud training mode 318 in response to orientation determiner 302 determining a physical orientation of housing 104. Selection of cloud training mode 318 may cause ML controller 306 to transmit images captured by image capturing unit 106, via network interface 112, to cloud computing device 124 for training ML model 116. As described earlier, cloud computing device 124 may comprise a device (or collection of devices) that is located remotely from camera 102 for training ML model 116, such as computers in a data center of a cloud computing network. In implementations, operation of camera 102 in cloud training mode 318 is similar to operation in edge training mode 316, except images may be transmitted to a different location target (e.g., the cloud) for ML training, rather than an edge computing device. Upon receiving images from camera 102 for ML training, cloud-based ML trainer 126 may train and deploy ML model 116 in a similar manner as described in step 506 with reference to edge-based ML trainer 130.

It is noted that during operation of camera 102 in edge training mode 316 or cloud training mode 318, images may be transmitted by camera 102 in any suitable manner. For instance, ML controller 306 may store images in storage 114 and transmit stored images to local computing device 128 or cloud computing device 124 after a predetermined time has elapsed or a predetermined number of images has been captured. In other implementations, ML controller 306 may transmit images in real-time or near real-time, such as upon capture, or may transmit a live feed of image capturing unit 106 to local computing device 128 or cloud computing device 124.

Furthermore, as described above, upon training ML model 116, the model may be deployed to one or more other devices. For instance, where ML trainer 308 trains ML model 116 within camera 102 in on-camera training mode 314, ML model 116 may remain within camera 102 where training was performed. If edge training mode 316 is selected, ML model 116 may be deployed to one or more cameras located in the same facility as local computing device 128. If cloud-training mode 318 is selected, ML model 116 may be deployed to one or more cameras located across various facilities or organizations. However, these examples are only illustrative, and ML model 116, once trained, can be selectively deployed to any other device, irrespective of where the model was trained. Further, even if ML model 116 was trained during on-camera training mode 314, it is also contemplated that images used during such training may also be transmitted to local computing device 128 or cloud computing device 124 for further ML training, such as where training may be performed using images from a plurality of different image capturing units.

Figure 6:
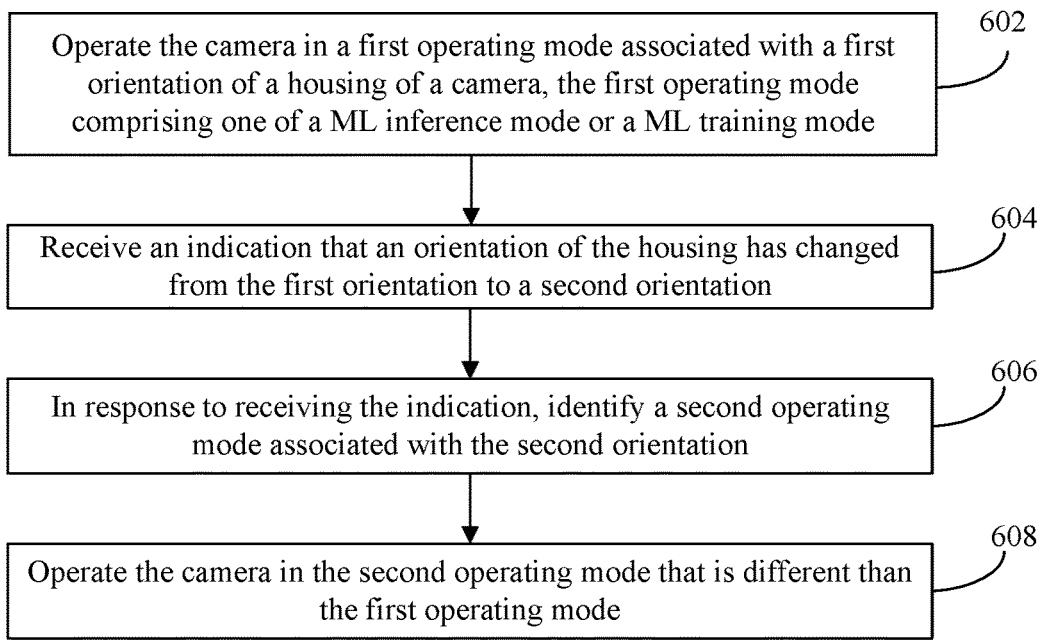
FIG. 6 shows a flowchart of a method for operating a camera based at least in part on an orientation change of the camera, in accordance with an example embodiment.

As described above, an operating mode for a camera can be switched from one ML operating mode to another ML operating mode in various ways. For example, FIG. 6 shows a flowchart of a method for operating a camera based at least in part on an orientation change of the camera, in accordance with an example embodiment. In an implementation, the method of flowchart 600 may be implemented by ML processing system 110. FIG. 6 is described with continued reference to FIGS. 1 and 3. Other structural and operational implementations will be apparent to persons skilled in the relevant art(s) based on the following discussion regarding flowchart 600, system 100 of FIG. 1, and system 300 of FIG. 3.

Flowchart 600 begins with step 602. In step 602, a camera is operated in a first operating mode associated with a first orientation of a housing of the camera, the first operating mode comprising one of a machine-learning inference mode or a machine-learning training mode. For instance, with reference to FIG. 3, operation mode selector 304 may select one of a plurality of operating modes in operating mode set 310 based on a first orientation of housing 104 determined by orientation determiner 302. The first orientation of housing 104 may comprise any physical orientation as described above, such as a rotational position of one portion of housing 104 relative to another portion of housing 104. As an illustration, the first orientation may be a physical orientation in which housing 104 has not been rotated from its default or normal orientation, during which operating mode selector 304 may select ML inference mode 312 associated with the determined orientation. In response to selection of ML inference mode 312, ML controller 306 operates camera 102 according to this mode by applying ML model 116 to images captured by image capturing unit 106 to generate ML inferences therefrom.

It is understood a plurality of physical orientations of housing 104 may be determined by orientation determiner 302, and each physical orientation may be associated with a particular operating mode that is selected by operating mode selector 304. Accordingly, the first orientation may also include an orientation in which operating mode selector 304 may select a ML training mode, such as on-camera training mode 314, edge training mode 316, or cloud training mode 318 associated therewith. Operation of camera 102 may be carried out by at least ML controller 306 based on the selected operation mode, in a similar manner as described above.

In step 604, an indication is received that an orientation of the housing has changed from the first orientation to a second orientation. For instance, with reference to FIG. 3, a user may alter a physical orientation of housing 104 based on a desired change to an operating mode of camera 102. Orientation sensor 108 may detect an orientation change (e.g., via one or more sensors), and orientation determiner 302 may receive an indication that the orientation of housing 104 has changed from the first orientation to a second orientation (e.g., a change from a unrotated orientation to a 90 degree orientation, or any other orientation change). As described above, the indication that the orientation has changed may be determined based on a rotation of housing 104 (or a portion thereof) from a first rotational position to a second rotational position, although other orientation changes are also contemplated and within the scope of the disclosed embodiments.

In step 606, in response to the receiving the indication that the orientation of the housing has changed, a second operating mode associated with the second orientation is identified. For instance, with reference to FIG. 3, operating mode selector 304 identifies a second operating mode different from the first operating mode in response to receiving an indication that an orientation of housing 104 has changed. Operating mode selector 304 may identify the new operating mode in various ways, such as by associating the detected orientation with one of a plurality of predetermined operating modes in operating mode set 310. The association may be stored in a table or other data structure that correlates a physical orientation with a particular operating mode As described herein, first operating mode and second operating mode may include any of ML inference mode 312, on-camera training mode 314, edge training mode 316, and cloud training mode 318. These operating modes are only intended to be illustrative, and any number of additional or fewer operating modes may be included in operating mode set 310, each associated with a different physical orientation of housing 104.

In step 608, the camera is operated in the second operating mode that is different than the first operating mode. For instance, with reference to FIG. 3, camera 102 may be operated in the second operating mode (e.g., the operating mode associated with the second orientation of housing 104) that is different than the first operating mode. Operation of camera 102 in the second operating mode may be carried out in a similar manner as described above. For instance, based on the which operating mode is selected as the second operating mode, ML controller 306 may apply ML model 116 to generate inferences, train ML model 116 using ML trainer 308 within the camera, trigger training of ML model 116 on a local computing device, or trigger training of ML model 116 on a cloud or other network-accessible computing device. In this manner, operating modes may be seamlessly switched based on repositioning housing 104 to a different physical orientation associated with a desired ML mode.

III. Example Computer System Implementation

Camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 may be implemented in hardware, or hardware combined with one or both of software and/or firmware. For example, camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 may be implemented as computer program code/instructions configured to be executed in one or more processors and stored in a computer readable storage medium.

Alternatively, camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 may be implemented as hardware logic/electrical circuitry.

For instance, in an embodiment, one or more, in any combination, of camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
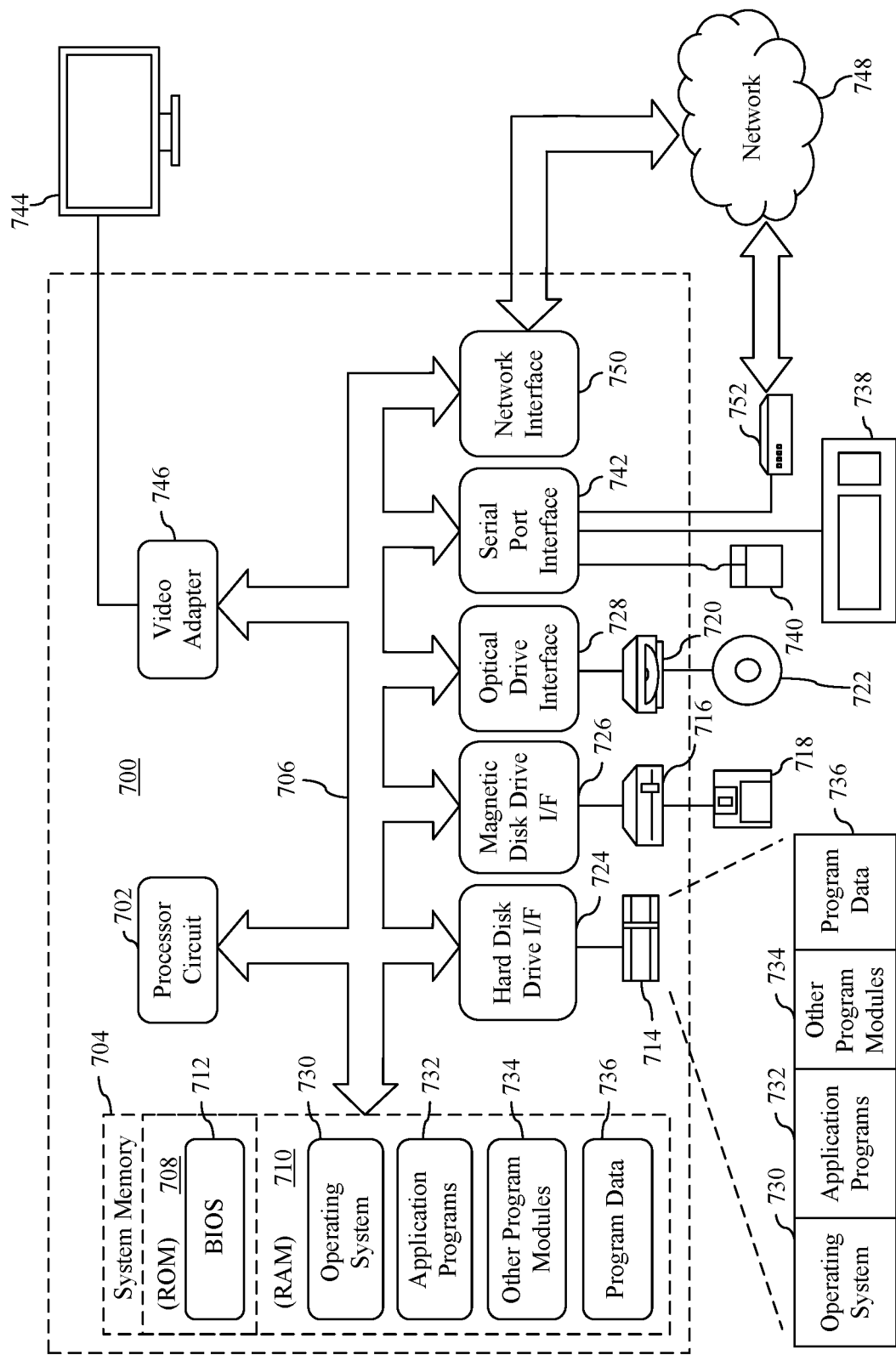
FIG. 7 is a block diagram of an example processor-based computer system that may be used to implement various embodiments.

FIG. 7 depicts an exemplary implementation of a computing device 700 in which embodiments may be implemented. For example, camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 (and/or any of the steps of flowcharts 200, 500, and 600 described therein) may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of camera 102, housing 104, image capturing unit 106, orientation sensor 108, ML processing system 110, network interface 112, storage 114, ML model 116, computing device 118, tracking system 118, configuration interface 122, cloud computing device 124, cloud-based ML trainer 126, local computing device 128, edge-based ML trainer 130, orientation determiner 302, operating mode selector 304, ML controller 306, ML trainer 308, operating mode set 310, ML inference mode 312, on-camera training mode 314, edge training mode 316, cloud training mode 318, system 400, system 410, flowchart 200, flowchart 500, and/or flowchart 600 and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A camera is disclosed herein. The camera includes: a housing; an image capturing unit attached to the camera housing; at least one processor circuit; and at least one memory that stores program code configured to be executed by the at least one processor circuit, the program code comprising: an orientation determiner configured to determine a physical orientation of the housing; an operating mode selector configured to select an operating mode from a set of operating modes that comprises a machine-learning inference mode and a machine-learning training mode in response to the determination of the physical orientation of the housing; and a machine-learning controller configured to process images obtained by the image capturing unit according to the selected operating mode.

In one implementation of the foregoing camera, the housing includes a first housing portion and a second housing portion, the first housing portion movable relative to the second housing portion; and the physical orientation of the housing comprises a physical orientation of the first housing portion relative to the second housing portion.

In another implementation of the foregoing camera, the first housing portion is rotatable around an axis relative to the second housing portion; and the physical orientation of the first housing portion comprises a rotational position of the first housing portion.

In another implementation of the foregoing camera, the image capturing unit is affixed to an interior of the first housing portion such that the image capturing unit rotates around the axis when the first housing portion is rotated around the axis.

In another implementation of the foregoing camera, in response to a selection of the machine-learning inference mode, the machine-learning controller is configured to apply a machine-learning model to images captured by the image capturing unit to generate a predicted output for each image, the machine-learning model stored in a storage device within the housing.

In another implementation of the foregoing camera, the machine-learning training mode comprises an on-camera training mode, the selection thereof causing the machine-learning controller to trigger training of machine-learning model using images captured by the image capturing unit, and the machine-learning model is stored in a storage device within the housing.

In another implementation of the foregoing camera, the machine-learning training mode comprises an edge training mode, the selection thereof causing the machine-learning controller to transmit images captured by the image capturing unit to a local computing device co-located with the camera for training a machine-learning model.

In another implementation of the foregoing camera, the machine-learning training mode comprises a remote training mode, the selection thereof causing the machine-learning controller to transmit images captured by the image capturing unit to a remote computing device located remotely from the camera for training a machine-learning model.

In another implementation of the foregoing camera, in response to a selection of the machine-learning training mode, the machine-learning controller is configured to initiate a network session with a computing device external to the camera.

A method is disclosed herein. The method includes determining a physical orientation of a housing of a camera; in response to the determining the physical orientation of the housing, select an operating mode from a set of operating modes comprising a machine-learning inference mode and a machine-learning training mode; and processing images obtained by an image capturing unit coupled to the housing according to the selected operating mode.

In one implementation of the foregoing method, the housing includes a first housing portion and a second housing portion, the first housing portion movable relative to the second housing portion; and the determining the physical orientation of the housing comprises determining a physical orientation of the first housing portion relative to the second housing portion.

In another implementation of the foregoing method, the first housing portion is rotatable around an axis relative to the second housing portion; and the determining the physical orientation of the first housing portion comprises determining a rotational position of the first housing portion.

In another implementation of the foregoing method, the image capturing unit is affixed to an interior of the first housing portion such that the image capturing unit rotates around the axis when the first housing portion is rotated around the axis.

In another implementation of the foregoing method, the selecting the operating mode comprises selecting the machine-learning inference mode; and the processing the images obtained by the image capturing unit comprises applying a machine-learning model to the images captured by the image capturing unit to generate a predicted output for each image, the machine-learning model stored in a storage device within the housing.

In another implementation of the foregoing method, the selecting the operating mode comprises selecting the machine-learning training mode, the selected machine-learning training mode comprising an on-camera training mode; and the processing the images obtained by the image capturing unit comprises training a machine-learning model using images captured by the image capturing unit, and the machine-learning model is stored in a storage device within the housing.

In another implementation of the foregoing method, the selecting the operating mode comprises selecting the machine-learning training mode, the selected machine-learning training mode comprising an edge training mode; and the processing the images obtained by the image capturing unit comprises transmitting images captured by the image capturing unit to a local computing device co-located with the camera for training a machine-learning model.

In another implementation of the foregoing method, the selecting the operating mode comprises selecting the machine-learning training mode, the selected machine-learning training mode comprising a remote training mode; and the processing the images obtained by the image capturing unit comprises transmitting images captured by the image capturing unit to a remote computing device located remotely from the camera for training a machine-learning model.

In another implementation of the foregoing method, the method further includes initiating a network session with a computing device external to the housing in response to a selection of the machine-learning training mode.

A method of selecting an operating mode of a camera is disclosed herein. The method includes: operating the camera in a first operating mode associated with a first orientation of a housing of the camera, the first operating mode comprising one of a machine-learning inference mode or a machine-learning training mode; receiving an indication that an orientation of the housing has changed from the first orientation to a second orientation; in response to the receiving the indication that the orientation of the housing has changed, identifying a second operating mode associated with the second orientation; and operating the camera in the second operating mode that is different than the first operating mode.

In one implementation of the foregoing method, the indication that the orientation of the housing has changed comprises an indication that the housing was rotated from a first rotational position to a second rotational position.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A camera, comprising:
   a housing;
   an image capturing unit attached to the camera housing;
   at least one processor circuit; and
   at least one memory that stores program code configured to be executed by the at least one processor circuit, the program code comprising:
   an orientation determiner configured to determine a physical orientation of the housing;
   an operating mode selector configured to select a machine-learning mode associated with the physical orientation of the housing, the selected machine-learning mode comprising one of a machine-learning inference mode associated with a first orientation of the housing and a machine-learning training mode associated with a second orientation of the housing; and
   a machine-learning controller configured to process images obtained by the image capturing unit according to the selected machine-learning mode.

2. The camera of claim 1, wherein the housing includes a first housing portion and a second housing portion, the first housing portion movable relative to the second housing portion; and
   wherein the physical orientation of the housing comprises a physical orientation of the first housing portion relative to the second housing portion.

3. The camera of claim 2, wherein the first housing portion is rotatable around an axis relative to the second housing portion; and
   wherein the physical orientation of the first housing portion comprises a rotational position of the first housing portion.

4. The camera of claim 3, wherein the image capturing unit is affixed to an interior of the first housing portion such that the image capturing unit rotates around the axis when the first housing portion is rotated around the axis.

5. The camera of claim 1, wherein in response to a selection of the machine-learning inference mode, the machine-learning controller is configured to apply a machine-learning model to images captured by the image capturing unit to generate a predicted output for each image, the machine-learning model stored in a storage device within the housing.

6. The camera of claim 1, wherein the machine-learning training mode comprises an on-camera training mode, the selection thereof causing the machine-learning controller to trigger training of a machine-learning model using images captured by the image capturing unit, the machine-learning model stored in a storage device within the housing.

7. The camera of claim 1, wherein the machine-learning training mode comprises an edge training mode, the selection thereof causing the machine-learning controller to transmit images captured by the image capturing unit to a local computing device co-located with the camera for training a machine-learning model.

8. The camera of claim 1, wherein the machine-learning training mode comprises a remote training mode, the selection thereof causing the machine-learning controller to transmit images captured by the image capturing unit to a remote computing device located remotely from the camera for training a machine-learning model.

9. The camera of claim 1, wherein in response to a selection of the machine-learning training mode, the machine-learning controller is configured to initiate a network session with a computing device external to the camera.

10. A method, comprising:
   determining a physical orientation of a housing of a camera;
   selecting a machine-learning mode associated with the physical orientation of the housing, the selected machine-learning mode comprising one of a machine-learning inference mode associated with a first orientation of the housing and a machine-learning training mode associated with a second orientation of the housing; and
   processing images obtained by an image capturing unit coupled to the housing according to the selected machine-learning mode.

11. The method of claim 10, wherein the housing includes a first housing portion and a second housing portion, the first housing portion movable relative to the second housing portion; and
   wherein the determining the physical orientation of the housing comprises determining a physical orientation of the first housing portion relative to the second housing portion.

12. The method of claim 11, wherein the first housing portion is rotatable around an axis relative to the second housing portion; and
   wherein the determining the physical orientation of the first housing portion comprises determining a rotational position of the first housing portion.

13. The method of claim 12, wherein the image capturing unit is affixed to an interior of the first housing portion such that the image capturing unit rotates around the axis when the first housing portion is rotated around the axis.

14. The method of claim 10, wherein the selecting the machine-learning mode comprises selecting the machine-learning inference mode; and
   wherein the processing the images obtained by the image capturing unit comprises applying a machine-learning model to the images captured by the image capturing unit to generate a predicted output for each image, the machine-learning model stored in a storage device within the housing.

15. The method of claim 10, wherein the selecting the machine-learning mode comprises selecting the machine-learning training mode, the selected machine-learning training mode comprising an on-camera training mode; and
   wherein the processing the images obtained by the image capturing unit comprises training a machine-learning model using images captured by the image capturing unit, the machine-learning model stored in a storage device within the housing.

16. The method of claim 10, wherein the selecting the machine-learning mode comprises selecting the machine-learning training mode, the selected machine-learning training mode comprising an edge training mode; and
   wherein the processing the images obtained by the image capturing unit comprises transmitting images captured by the image capturing unit to a local computing device co-located with the camera for training a machine-learning model.

17. The method of claim 10, wherein the selecting the machine-learning mode comprises selecting the machine-learning training mode, the selected machine-learning training mode comprising a remote training mode; and
   wherein the processing the images obtained by the image capturing unit comprises transmitting images captured by the image capturing unit to a remote computing device located remotely from the camera for training a machine-learning model.

18. The method of claim 10, further comprising:
   initiating a network session with a computing device external to the housing in response to a selection of the machine-learning training mode.

19. A method of selecting an operating mode of a camera, the method comprising:
   operating the camera in a first operating mode associated with a first orientation of a housing of the camera, the first operating mode comprising one of a machine-learning inference mode or a machine-learning training mode;
   receiving an indication that an orientation of the housing has changed from the first orientation to a second orientation;
   in response to the receiving the indication that the orientation of the housing has changed, identifying a second operating mode associated with the second orientation; and
   operating the camera in the second operating mode that is different than the first operating mode.

20. The method of claim 19, wherein the indication that the orientation of the housing has changed comprises an indication that the housing was rotated from a first rotational position to a second rotational position.

* * * * *